(12) United States Patent
Browne et al.

(10) Patent No.: US 7,823,972 B2
(45) Date of Patent: Nov. 2, 2010

(54) RECLINER ADJUSTMENT UTILIZING ACTIVE MATERIAL SENSORS

(75) Inventors: Alan L. Browne, Grosse Pointe, MI (US); Nancy L. Johnson, Northville, MI (US); Artie J Martin, Fraser, MI (US); James Y. Khoury, Macomb, MI (US); William B. Carter, Ventura, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/274,786

(22) Filed: Nov. 20, 2008

(65) Prior Publication Data

US 2009/0072604 A1    Mar. 19, 2009

Related U.S. Application Data

(63) Continuation-in-part of application No. 12/206,893, filed on Sep. 9, 2008, which is a continuation-in-part of application No. 11/933,682, filed on Nov. 1, 2007.

(60) Provisional application No. 60/863,882, filed on Nov. 1, 2006.

(51) Int. Cl.
*B60N 2/20* (2006.01)
(52) U.S. Cl. .............. 297/217.2; 297/362.11; 297/378.1
(58) Field of Classification Search .............. 297/217.2, 297/330, 362.11, 378.1
See application file for complete search history.

(56) References Cited

U.S. PATENT DOCUMENTS

| | | | | |
|---|---|---|---|---|
| 4,669,780 A * | 6/1987 | Sakakibara et al. | ..... 297/330 X |
| 4,813,721 A * | 3/1989 | Mora | ..... 297/343 X |
| 4,944,554 A * | 7/1990 | Gross et al. | ..... 297/330 X |
| 5,931,532 A * | 8/1999 | Kemmerer et al. | ..... 297/330 |
| 6,283,504 B1 * | 9/2001 | Stanley et al. | ..... 180/272 X |
| 6,371,552 B1 * | 4/2002 | Narita et al. | ..... 297/217.3 X |
| 6,402,195 B1 * | 6/2002 | Eisenmann et al. | ..... 297/410 X |
| 6,428,095 B1 * | 8/2002 | Hirata | ..... 297/217.3 |
| 6,953,224 B2 * | 10/2005 | Seto et al. | ..... 297/217.3 |
| 7,053,575 B2 * | 5/2006 | Fukuhara et al. | ..... 297/330 X |
| 7,109,677 B1 * | 9/2006 | Gagnon et al. | ..... 297/330 X |
| 7,118,178 B2 * | 10/2006 | Daniels | ..... 297/362.11 X |
| 7,134,715 B1 * | 11/2006 | Fristedt et al. | ..... 297/217.3 X |
| 7,264,271 B2 * | 9/2007 | Barvosa-Carter et al. | ..... 297/216.1 X |
| 7,293,836 B2 * | 11/2007 | Browne et al. | ..... 297/344.11 |
| 7,367,624 B2 * | 5/2008 | Garland | ..... 297/362.11 |
| 7,401,834 B2 * | 7/2008 | Browne et al. | ..... 297/216.1 X |
| 7,448,678 B2 * | 11/2008 | Browne et al. | ..... 297/216.12 |
| 7,461,896 B2 * | 12/2008 | Welles et al. | ..... 297/330 |
| 7,461,897 B2 * | 12/2008 | Kruse et al. | ..... 297/330 |
| 7,523,803 B2 * | 4/2009 | Breed | ..... 297/217.3 X |
| 7,556,313 B2 * | 7/2009 | Browne et al. | ..... 297/216.12 |
| 7,594,697 B2 * | 9/2009 | Browne et al. | ..... 297/216.12 |

(Continued)

FOREIGN PATENT DOCUMENTS

JP    05278507 A    * 10/1993

(Continued)

*Primary Examiner*—Rodney B White

(57) ABSTRACT

A recliner including a power adjustment system operable at a first rate, and at least one sensor including an active material element, wherein the sensor is configured to determine an obstacle to adjustment and selectively retard the rate when the obstacle is determined.

13 Claims, 6 Drawing Sheets

U.S. PATENT DOCUMENTS

| | | |
|---|---|---|
| 7,594,699 B2 * | 9/2009 | Satta et al. ............. 297/362.11 |
| 7,598,881 B2 * | 10/2009 | Morgan ............... 297/217.2 X |
| 2003/0214161 A1 * | 11/2003 | Seto et al. ................ 297/217.3 |
| 2004/0056520 A1 * | 3/2004 | Cho ........................ 297/218.1 |
| 2004/0195892 A1 * | 10/2004 | Daniels ................... 297/378.1 |
| 2005/0121959 A1 * | 6/2005 | Kruse et al. ................ 297/330 |
| 2005/0168035 A1 * | 8/2005 | Boudinot ................. 297/378.1 |
| 2005/0264069 A1 * | 12/2005 | Makhsous et al. ........ 297/284.1 |
| 2006/0137481 A1 * | 6/2006 | Schmied et al. ....... 297/217.2 X |
| 2006/0192417 A1 * | 8/2006 | Ellinger et al. ........... 297/217.3 |
| 2007/0013215 A1 * | 1/2007 | Browne et al. ........... 297/250.1 |
| 2007/0063566 A1 * | 3/2007 | Browne et al. ......... 297/344.11 |
| 2007/0075575 A1 * | 4/2007 | Gregory et al. .......... 297/217.3 |
| 2007/0188004 A1 * | 8/2007 | Browne et al. ............. 297/391 |
| 2007/0246979 A1 * | 10/2007 | Browne et al. ......... 297/216.12 |
| 2007/0262629 A1 * | 11/2007 | Kruse et al. ................ 297/330 |
| 2007/0267909 A1 * | 11/2007 | Truckenbrodt et al. ...... 297/410 |
| 2008/0007103 A1 * | 1/2008 | Welles et al. ................ 297/330 |
| 2008/0252113 A1 * | 10/2008 | Alexander et al. ..... 297/216.12 |
| 2008/0252117 A1 * | 10/2008 | Backendorf ............... 297/217.3 |
| 2008/0255733 A1 * | 10/2008 | McMillen et al. ..... 297/217.3 X |
| 2008/0315639 A1 * | 12/2008 | Wenmackers et al. .... 297/217.3 |
| 2009/0005936 A1 * | 1/2009 | Browne et al. ........ 297/217.2 X |
| 2009/0008973 A1 * | 1/2009 | Browne et al. ......... 297/216.12 |
| 2009/0121532 A1 * | 5/2009 | Kruse et al. ................ 297/330 |
| 2009/0152916 A1 * | 6/2009 | Lin et al. .................. 297/217.3 |
| 2009/0224587 A1 * | 9/2009 | Lawall et al. ............... 297/353 |
| 2009/0236884 A1 * | 9/2009 | Lawall et al. ............. 297/217.3 |
| 2009/0243354 A1 * | 10/2009 | Farquhar et al. ........ 297/216.12 |
| 2010/0066151 A1 * | 3/2010 | Usoro et al. ................ 297/481 |

FOREIGN PATENT DOCUMENTS

| | | | |
|---|---|---|---|
| JP | 06135270 A | * | 5/1994 |
| JP | 06227297 A | * | 8/1994 |

* cited by examiner

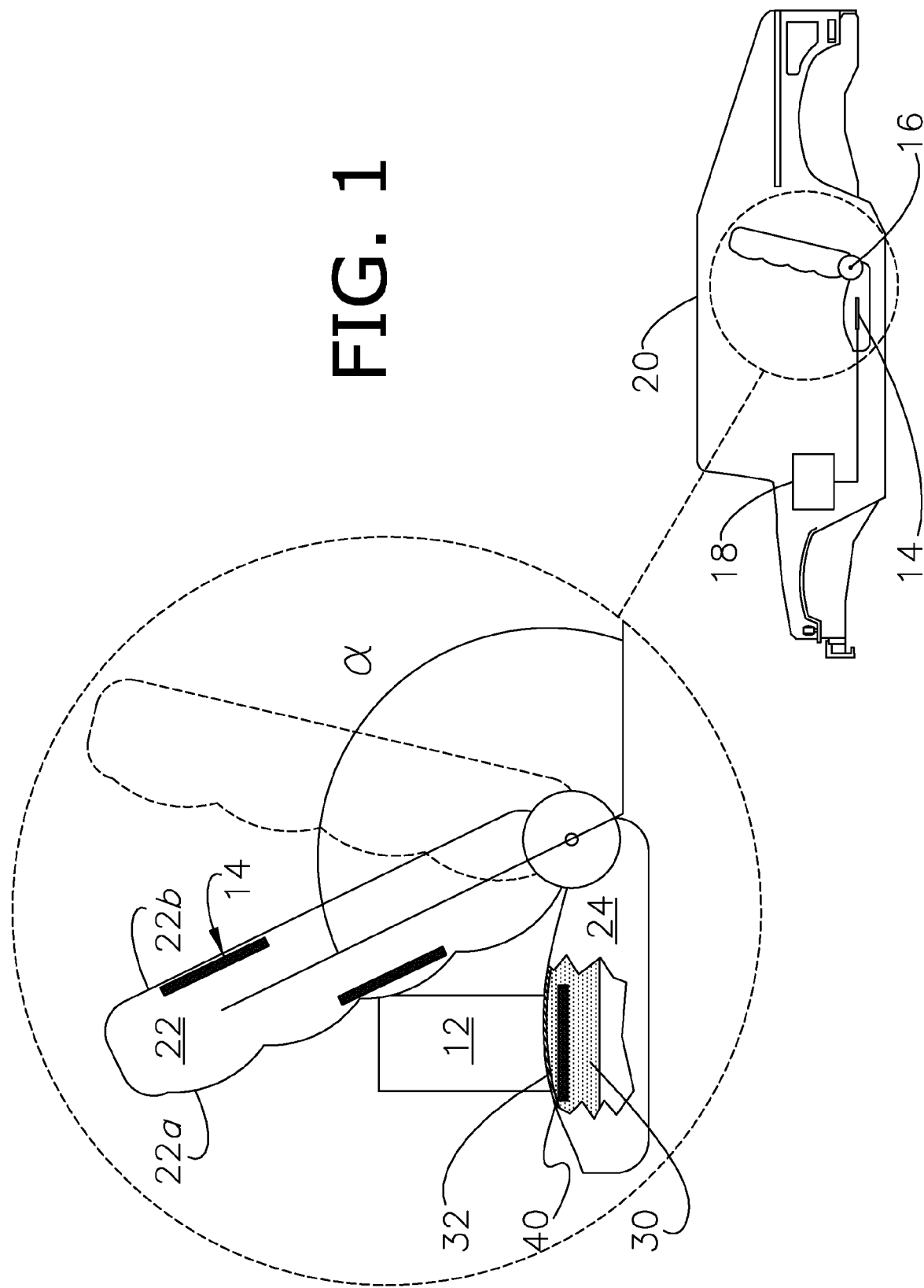

RECLINER ADJUSTMENT UTILIZING ACTIVE MATERIAL SENSORS

CROSS-REFERENCES TO RELATED APPLICATIONS

This U.S. Non-Provisional patent application is a continuation-in-part and claims the benefit of pending U.S. Non-Provisional application Ser. No. 12/206,893 (hereinafter the 893-Application), filed on Sep. 9, 2008, and entitled SYSTEM FOR DETECTING ANIMATE OBJECTS IN A VEHICLE COMPARTMENT, which is a continuation-in-part of U.S. patent application Ser. No. 11/933,682 (hereinafter the 682-Application), filed Nov. 1, 2007, which claims the benefit of U.S. Provisional Application No. 60/863,882, filed Nov. 1, 2006, the disclosures of which are hereby incorporated by reference in their entireties.

BACKGROUND

1. Field of the Invention

The present disclosure relates to recliner adjustment systems, and methods of reclining an engaging surface, and more particularly, to a power adjusting recliner including at least one active-material sensor that is configured to selectively retard the rate of adjustment.

2. Discussion of Prior Art

Conventional recliners have most recently been developed to include autonomously (e.g., electro-mechanical, electro-pneumatic, etc.) adjusting systems that modify the angle of inclination defined by the engaging surfaces of the recliner. In an automotive setting, for example, passenger seats are often reclineable by remotely actuating a power adjustment system. Remote actuation conveniently allows the user to adjust front or rear seats, so as to better accommodate objects (e.g., passengers, groceries, bottles, child safety seats, etc.) placed thereupon or in proximity therewith, and/or modify arrear storage spaces defined in part by the upright seat backs. Concernedly, however, it is appreciated that the remote control of seat adjustment from the front of the vehicle cabin has produced various concerns in the art, including the inadvertent pinching of the afore-mentioned objects. To address this concern, conventional remotely actuated seats typically feature significantly reduced adjustment speeds. This has reduced the likelihood of damaging an object, and most notably, inadvertently pressing against a passenger with an uncomfortably high pressure; however, it is also appreciated that retarding the rate of adjustment has resulted in extended adjustment times, which further present concerns to the user.

BRIEF SUMMARY

Responsive to these continued concerns, preferred embodiments of an improved recliner and method of adjusting the angle of inclination of the recliner that enables faster adjustment speeds, while guarding against harm to objects or uncomfortable levels of pressure applied to occupants, is presented. Among other things, the invention is useful for providing means for detecting the presence of objects, including passengers, reposed upon the engagement surfaces of the recliner. The recliner relies upon the natural response of active materials when exposed to an activation signal to provide a reliable, efficient, and quiet means of sensing an object. Advantageously, it is appreciated that active material systems present significantly fewer parts than do counterpart electro-mechanical, electric, electro-pneumatic/hydraulic systems, and that as such, utilizing active material based sensors results in minimal added cost, weight, packaging space, and complexity. Moreover, it is appreciated that active material based sensing also results in lower repair and replacement costs, as well as significantly less noise (both acoustically and with respect to EMF).

A first aspect of the invention concerns a recliner adapted for supporting an object and determining an obstacle to adjustment. The recliner includes a base configured to support the object, and a structural member pivotally connected to the base and configured to further support the object. The base and member cooperatively define an angle of inclination therebetween. The recliner further includes a power adjustment system configured to autonomously adjust the angle, and at least one sensor secured to the base or member. The sensor is operable to detect the presence of the object, and includes an active material element operable to undergo a change in at least one attribute when exposed to an activation signal or when exposure to the signal is discontinued. The sensor is communicatively coupled to and configured to prevent the actuation of the system, when the object is detected.

A second aspect concerns a method of selectively retarding the adjustment rate of a recliner surface. The method begins by securing at least one active material sensor including an active material element operable to undergo a change when exposed to an activation signal and detect an object on or near the surface as a result of the change. Next a power adjustment system configured to autonomously manipulate the surface at a first rate is attempted to be actuated. It is determined whether the object is autonomously detected using the sensor, and if so whether an obstacle to adjustment based upon the detection is determined. Finally, the rate is autonomously reduced when such an obstacle is determined. Another element that could be contemplated is that an audible warning could be included when the reclining action has been requested (by pushing a button for example) but the presence of an object has been detected. This warning would be suggestive that the location is not clear of potentially interfering objects and that these should be removed prior to a next attempt at reclining.

Further aspects of the invention including the application of piezoelectric based sensors, preferred sensor configurations and placements, control logic, and more are further described and exemplified by the following figures and detailed description.

BRIEF DESCRIPTION OF THE DRAWINGS

Preferred embodiments of the invention are described in detail below with reference to the attached drawing figures, wherein:

FIG. 1 is a side elevation of a vehicle including a reclining rear seat (in enlarged caption) having intercommunicating power adjustment system and active material sensors, in accordance with a preferred embodiment of the invention;

DETAILED DESCRIPTION

Figure 3:
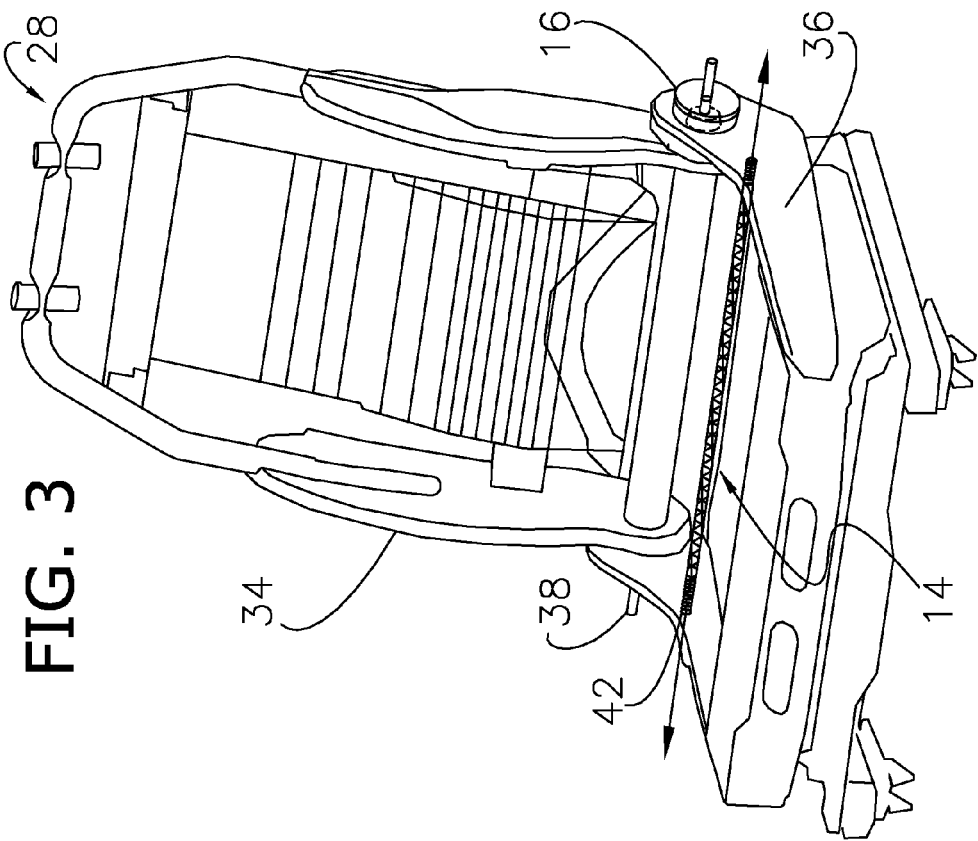
FIG. 3 is a perspective view of the interior frame/workings of a reclining seat, particularly illustrating the power adjustment system, and the attachment of an active material sensor to the frame, in accordance with a preferred embodiment of the invention.

Referring to FIGS. 1-9, the present invention involves an adjustable recliner 10 and a method of modifying the adjustment rate of the recliner 10 when an object 12 (e.g., a passenger, a bag of groceries, glass bottles, child safety seat, etc.) is reposed thereupon or in physically proximity therewith, so as to be contacted by the rotating portion. The recliner 10 generally includes at least one active material sensor 14 operable to detect an attribute or characteristic of the object 12 as further described herein, and a power adjustment system 16 communicatively coupled to the sensor 14. The power adjustment system 16 is of the type remotely actuated, e.g., by depressing a button or toggling a switch connecting the system 16 to an electrical or remote (for example, through an RF transmitter, such as a keyfob) power source 18, and operable to autonomously adjust the angle of inclination, α (FIG. 1), defined by the recliner 10. More particularly, sensor input is used to reduce, reverse, or arrest the rate of adjustment by the system 16 when an object 12 is detected.

The inventive recliner 10 utilizes at least one, and more preferably a plurality of active-material based sensors to detect the object 12. That is to say, each sensor 14 utilizes the responsive action of an active material to perform its primary function, and is of a type activated by exposure to at least one attribute or characteristic of the targeted objects. For example, a thermally activated active material may be used to detect objects that radiate heat energy, such as living things, or a force or pressure activated material may be used to detect objects having sufficient mass/weight to generate a minimal force or pressure, as shown and described herein.

The invention is described and illustrated with respect to the reclining function of a remotely actuated rear passenger seat 12 of the vehicle 20 shown in FIG. 1; however, it is certainly within the ambit of the invention to use its benefits and advantages in other applications, or wherever remote actuation, and concerns regarding the rate of adjustment and/or damage to objects exist. As such, it is appreciated that the following description of preferred embodiments of the recliner 10 and methods of selective adjustment is merely exemplary in nature and not intended to limit the invention.

I. Active Material Discussion and Function

As used herein the term "active material" shall be afforded its ordinary meaning as understood by those of ordinary skill in the art, and includes any material or composite that exhibits a reversible change in a fundamental (e.g., chemical or intrinsic physical) property, when exposed to an external signal source. Thus, active materials shall include those compositions that can exhibit a change in stiffness properties, shape and/or dimensions in response to the activation signal, which can take the type for different active materials, of electrical, magnetic, thermal, stress and like fields.

Suitable active materials for use with the present invention include but are not limited to piezoelectric polymers, piezoelectric ceramics, other electro-restrictives, magneto-restrictives, electroactive polymers (EAP), and shape memory materials. More particularly, it is appreciated that other active materials, such as shape memory alloys (SMA), shape memory polymers (SMP), ferromagnetic SMA's, electrorheological (ER) compositions, magnetorheological (MR) compositions, dielectric elastomers, ionic polymer metal composites (IPMC), various combinations of the foregoing materials, and the like, may be employed in the present invention depending upon object characteristics/attributes and the configuration of the application.

More particularly, piezoelectric materials include, but are not limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly (poly(vinylamine) backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric materials can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and mixtures thereof and Group VIA and IIB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of Ferroelectric-electrostrictive, molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

II. Exemplary Recliner Configurations and Methods

Referring to FIGS. 1-5, the illustrated recliner 10 presents an upright structural member (e.g., seatback portion) 22 that is pivotally connected to a base (e.g., a lower seat portion) 24. The member 22 and base 24 are able to be relatively fixed when a desired angle of inclination is achieved by engaging a locking mechanism (not shown). In the illustrated embodiment, the recliner 10 further includes a separate headrest 26 fixedly or removably attached to the member 22. The member 22, base 24, and headrest 26 define engaging surface 22a, 24a, and 26a respectively configured to engage the object 12 based on the orientation and configuration of the recliner 10.

The recliner 10 is supported by a structural frame 28 (FIGS. 1 and 3) interior to a foam or cushion layer 30 that is compressed when the object 12 is reposed thereupon, and to a soft yet durable cover 32 that is exterior to the layer 30 (FIG. 1). The frame 28 includes, among other structural elements, the vertical side rails 34 of the support member 22 and the horizontal rails 36 of the base 24. A rod 38 interconnects the rails 34,36. To adjust the recliner 10, it is appreciated that the support member 22 is caused to pivot relative to the base 24 and about the central axis defined by the rod 38.

The power adjustment system 16 is configured to selectively engage the member 22 with an electro-mechanical motor, solenoid, active material based drive, or the like, so as to cause the member 22 to pivot relative to the base 24. The system 16 may be a conventional electric motor/gear drive system, or more preferably, an active material actuator (not shown) operable to convert a change in an active material element into rotational displacement. Power adjustment systems 16 suitable for use with the present invention are readily determinable by those of ordinary skill in the art, and as such will not be further described herein.

As previously mentioned, the inventive recliner 10 includes at least one, and more preferably, a plurality of active material sensors 14 in operative communication with the power adjustment system 16. The configuration of the sensors 14 may be of the types shown and described in the 682- and 893-Applications, said descriptions having been fully incorporated by reference. As such, each sensor 14 includes an active material element 40 as described therein, and in embodiments further described therein, it is appreciated that a sensor 14 employing a shape memory material to simultaneously detect force (caused by the presence of an object in a passenger compartment) and temperature (by changing their response to stress) can be used to provide input to the power adjustment system 16. Here, the shape memory material is operatively connected to an electric circuit such that the state of the circuit (i.e., open or closed) is dependent on the amount of force and the temperature sensed by the shape memory material. The power adjustment system 16 is operatively connected to, so as to be controlled by the state of, the circuit.

In the illustrated embodiments, however, the active material element 40 is operable to create an electrical charge or current when deformed or displaced by a force applied thereto; and as such, comprise an active material that generates an electrical charge or current when deformed, such as piezoelectric material. More preferably, a piezopolymer element 40 presenting a thin and flexible uni-morph, bi-morph, patch, woven fiber, or other configuration may be utilized. Other materials that may be employed to generate a charge or current in response to deformation or displacement include piezoeramics as fibers, unimorphs, bimorphs, patches, etc.; electroactive polymers (EAP), for example, as thin and flexible patches; membranes/enclosed cavities containing fluids with magnetic particles surrounded by electrical conducting medium—such as highly conductive rubber—the motion/flow of which fluid would result in a current/voltage being generated; magnetorestrictive composites wherein flexure of the magnetorestrictive material generates a changing magnetic field and induces a current in a coil; ionic polymer metal composites; multiferroic materials (hybrid piezo/magnetostrictive); Ferroelectret foams; resonant magnet/coil combinations; etc.

It is appreciated that detection of the object 12 through use of piezoelectric materials produces a time-dependent determination. That is to say, the charge is produced by a change in force/pressure over a period, and as such is determined by the change in deformation or displacement in the material. This results in the understanding that objects reposed motionlessly for long periods will not be detected by these types of sensors 14 (i.e., would not produce a measurable charge); and therefore an obstacle to adjustment would not be determinable where the vehicle has remained stationary with little to no vibratory input for a period of time prior to activation of the recliner 10. It is with this in mind, that the preferred recliner 10 includes sensors 14 in both the base 24 and upright member 22, so that as the member 22 is caused to swing forward an object 12 reposed motionlessly upon the base 24 would be detected by the sensor 14 associated with the member 22. It is appreciated that the object 12 may then be caused to move relative to the base 24 by the member 22 sufficient to register a charge upon the base sensor(s) 14 as well.

Moreover, the sensor(s) 14 are configured such that proximate objects (e.g., in front of or behind the recliner 10) within the spatial envelop swept through by the upper portion of the member 22 are detected as well. For example, where the member 22 anticipates opposite first and second engaging surfaces 22a,b, as shown in FIG. 1, each surface is communicatively coupled to a separate sensor 14, so that the member 22 is able to detect fore and arrear objects 12 when the angle of inclination is decreased and increased respectively. To facilitate this function, sensors 14 are preferably positioned at or near the upper corners of the member 22, as shown in FIG. 2.

Figure 2:
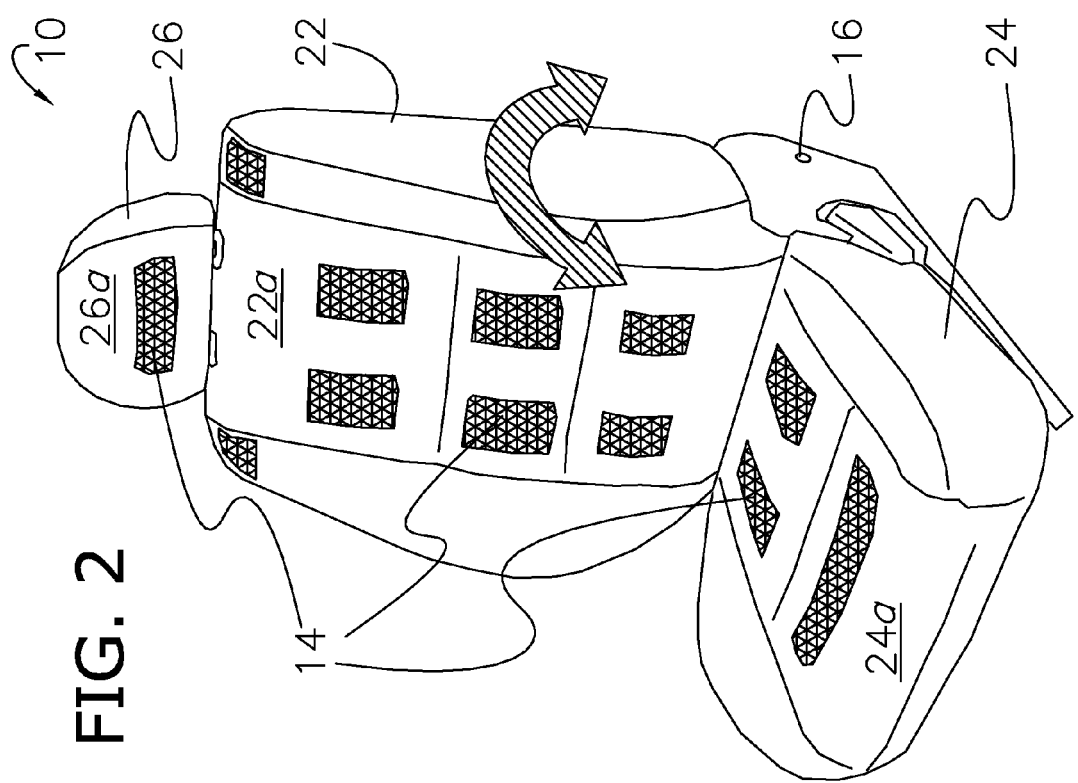
FIG. 2 is a perspective view of a reclining seat, particularly illustrating the configuration of a plurality of active material sensors presenting patch configurations, in accordance with a preferred embodiment of the invention.
Figure 5:
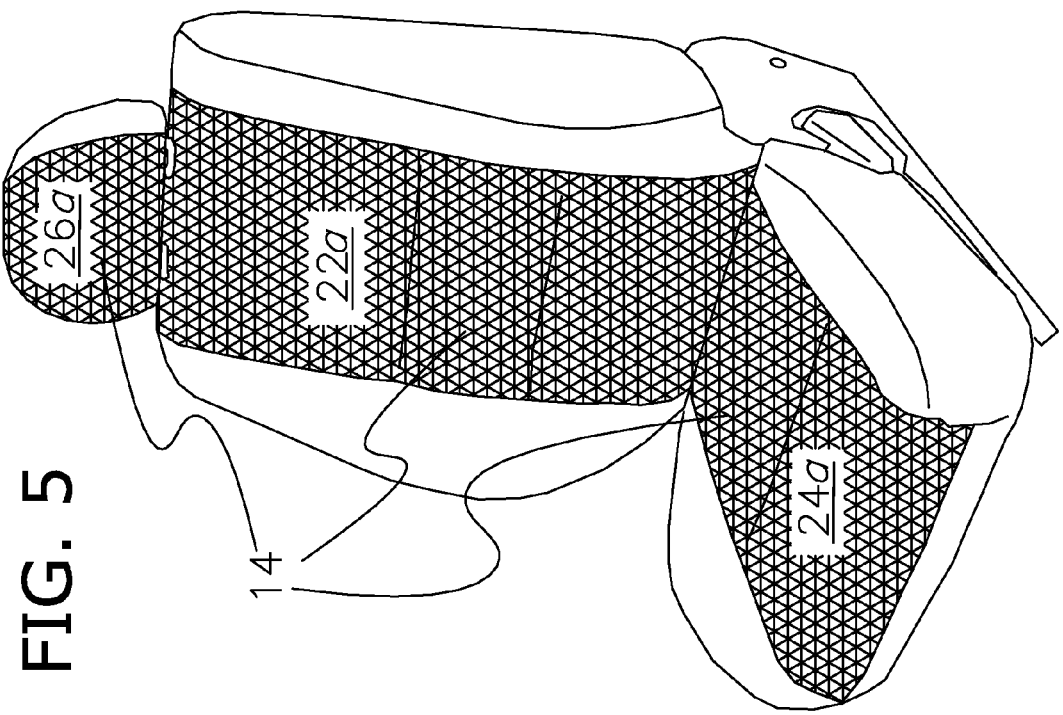
FIG. 5 is a perspective view of a reclining seat, particularly illustrating the configuration of a plurality of active material sensors presenting sheet configurations, wherein the sheets coextend with the engagement surfaces of the recliner, in accordance with a preferred embodiment of the invention.
Figure 4:
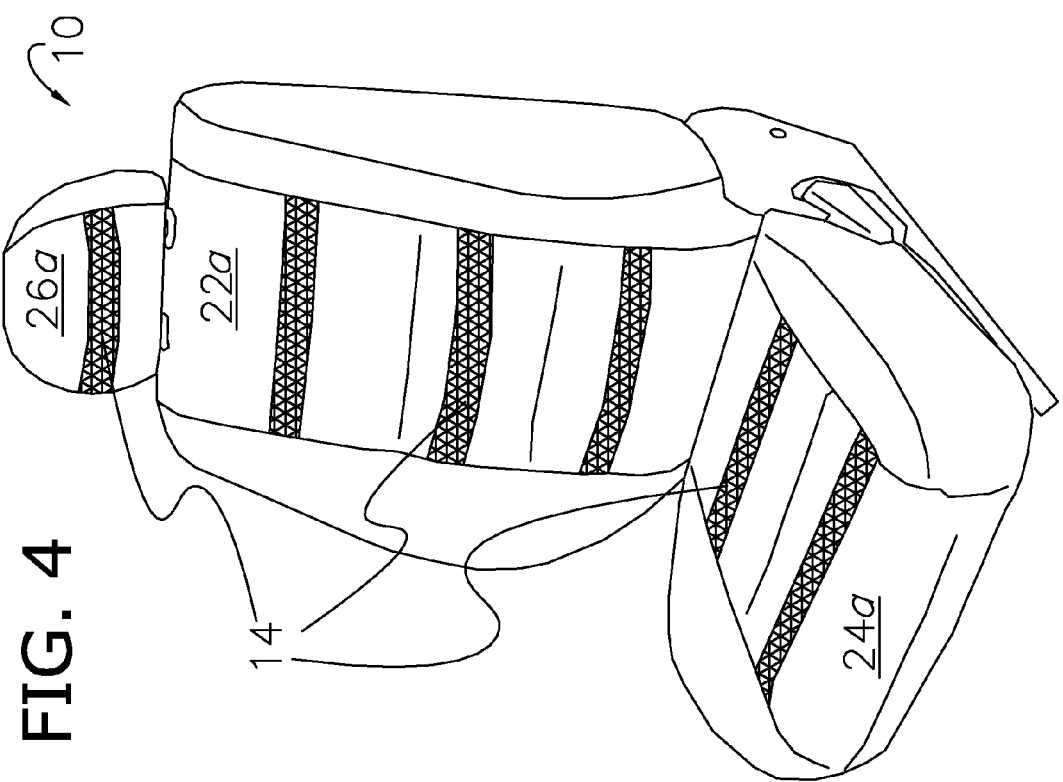
FIG. 4 is a perspective view of a reclining seat, particularly illustrating the configuration of a plurality of active material sensors presenting strip configurations, in accordance with a preferred embodiment of the invention.

As shown in FIG. 2, the preferred element 40 is in the shape of a patch presenting a lateral surface area of engagement between 1 to 20, more preferably, 2 to 10, and most preferably 3 to 4 cm². Alternatively, the element 40 may be in the shape of a strip presenting a lateral dimension and a longitudinal dimension greater than five, and more preferably, ten times the lateral dimension (FIGS. 3 and 4). In this configuration, it is desirable to pre-tension the element 40 along the longitudinal axis, so as to increase the sensitivity of measurement. For example, and as shown in FIG. 3, a strip element 40 may be attached to the frame 28 by oppositely biasing extension springs 42. Finally, and as shown in FIG. 5, the element 40 may present a sheet having a lateral surface area of engagement not less than 100 cm². More preferably, the sheet, which may be an amalgamation of a plurality of elements 40, presents a lateral surface area and configuration sufficient to generally coextend with the respective engagement surface.

The element 40 may be positioned within (FIG. 1) or under the foam layer 30, or under the exterior cover 32, with the understanding that certain characteristics, such as the sensitivity of the sensors 14 are directly, while others, such as notice-ability to a passenger, are inversely proportional to depth. Moreover, the depth of positioning the element 40 may vary for the base 24, member 22, and headrest 26, as it is appreciated, for example, that greater force/pressure will be caused to engage the base 24 as opposed to the headrest 26.

Figure 6:
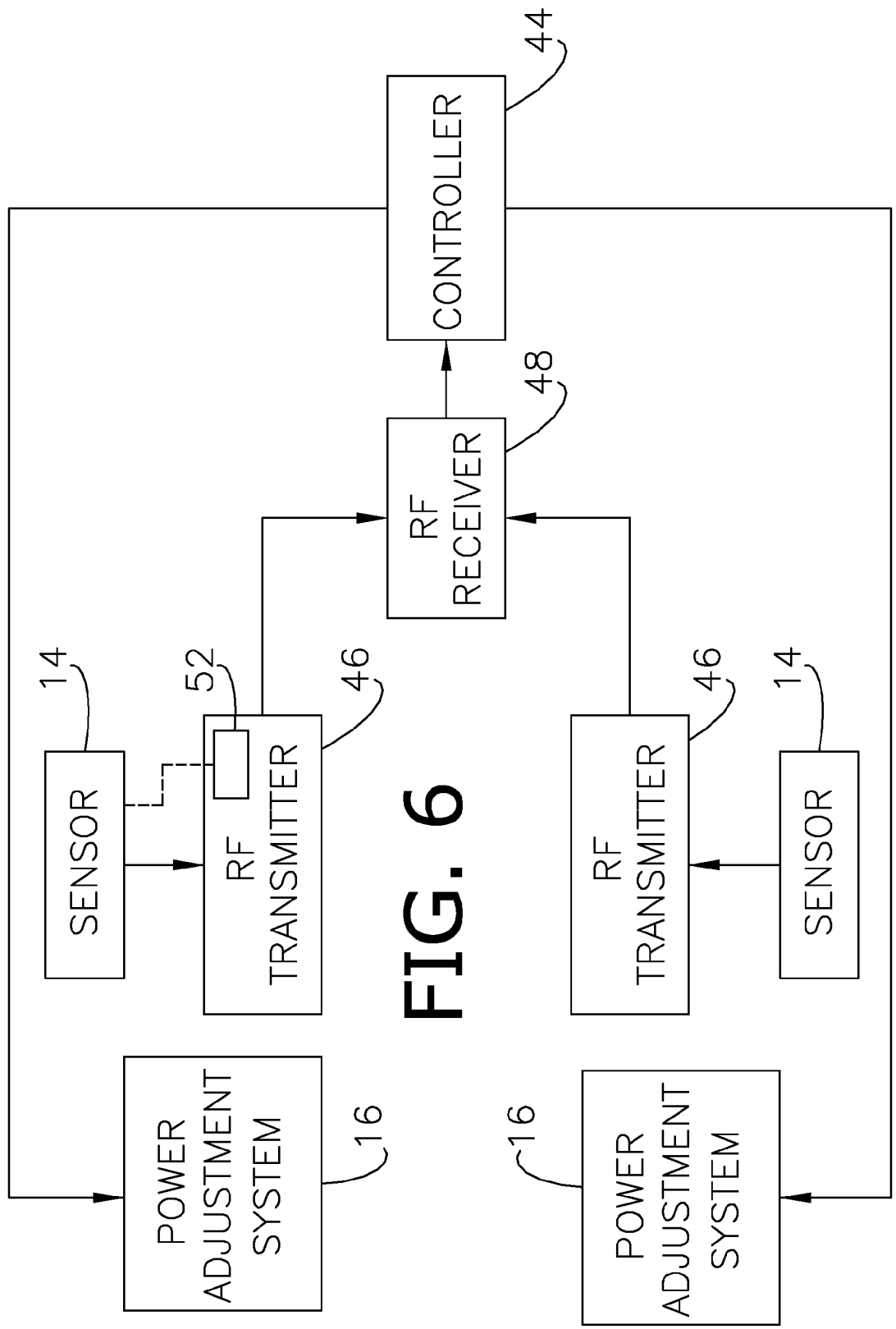
FIG. 6 is a schematic diagram of two recliners each including an active material sensor, and RF transmitter in communication with an RF receiver, controller, and respective power adjustment system, in accordance with a preferred embodiment of the invention.
Figure 9:
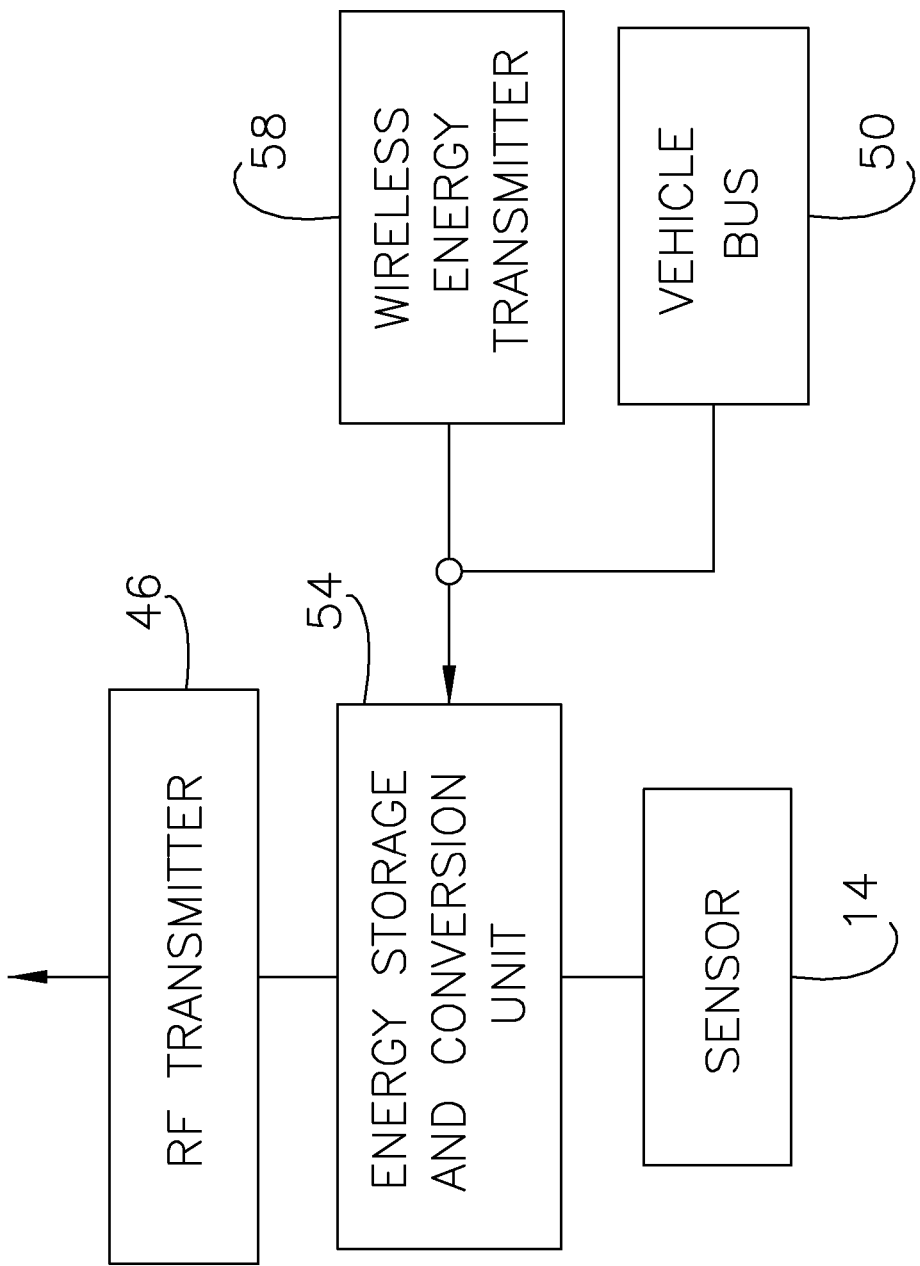
FIG. 9 is a segmental view of the schematic reflected in FIG. 7 further including a wireless energy transmitter and a vehicle bus, alternatively coupled to each energy storage and conversion unit, in accordance with a preferred embodiment of the invention.

In the preferred embodiment, each sensor 14 is operatively connected to a controller 44 through a respective wireless, radio frequency (RF) transmitter 46 (FIG. 6). The sensors 14 and transmitters 46 may be coupled by conductive wires, so that the current generated by the sensor 14 as a result of deformation or displacement is used by the transmitter 46 to generate a wireless, radio frequency data signal. As such, the preferred recliner 10 further includes an RF receiver 48 that is sufficiently positioned with respect to the transmitters 46 to receive the data signals. The receiver 48 is operatively connected to the controller 44, such as via conductive wires, and configured to communicate to the controller 44 whether a signal is being transmitted by one of the transmitters 46. Alternatively, it is appreciated that the transmitters 46 and receiver 48 may be coupled via conductive wire, such as through the vehicle bus 50 (FIG. 9).

It will be appreciated that a pre-processor could be employed to operate on the signal prior to conveying to the controller 44, so as to determine whether the signal has certain characteristics. For example, operations on the signal could include filtering, power spectral density analysis, or amplification. With respect to the later, an amplifier 52 (FIG. 6) may be communicatively coupled to each transmitter 46 and configured to selectively increase the amplitude of the signal, such as in high-sensitivity applications (e.g., wherein deformation and resultant charges are low, indicating a light object, such as a baby or child).

In the illustrated embodiment, the RF receiver 48 and controller 44 are separately depicted onboard the vehicle 20, i.e., mounted with respect to the vehicle body. However, the receiver 48 may also be integrally assembled as part of the controller 44 within the scope of the claimed invention.

The controller 44 is operatively connected to the power adjustment system 16, such as via conductive wires (e.g., through the vehicle bus 50), and configured to selectively transmit command signals thereto. In response to the command signals from the controller 44, the power system 16 is caused to adjust the angle of inclination, as is known in the art.

It is desirable for each component (e.g., base 24, member 22, and headrest 26) of the recliner 10 to include multiple sensors 14 so that movement associated with background vibration of the vehicle 20, as a result of raindrops, wind, passing vehicles, etc., does not cause the controller 44 to erroneously perform. Accordingly, the controller 44 preferably performs filtering or other processing. For example, and within the scope of claimed invention, control logic executed by the controller 44 may include inquiring whether less than all of the sensors 14 are being deformed or displaced, or whether the displacement or deformation of the elements 40 is occurring at different times. The sensors 14, transmitters 46, and receiver 48 are preferably configured such that the signal transmitted to the controller 44 is unique for each of the sensor 14 so that the controller 44 can distinguish which of the sensors are being deformed or displaced. The controller 44 proceeds to issue a command only if the answer to the inquiry is affirmative or meets a pre-determined threshold. For example, and as previously mentioned, the command may be configured to cause the power system 16 to retard, arrest or reverse the rate of adjustment; and/or, where the controller 44 is further coupled to at least one speaker (such as the vehicle audio/video system), to cause an audible warning to be generated.

It should be noted that the sensors 14 and transmitters 46 may be mounted with respect to a stand-alone recliner 10 that is selectively removable from the vehicle 20. In this configuration, the sensor 14 preferably includes an energy storage and conversion unit 54 (FIG. 7) that receives and stores a portion of the charge or current generated by deformation or dislocation of the sensor 14. For example, the unit 54 may include a capacitor, accumulator, or chemical battery (not shown). The unit 54 is in turn operatively connected, so as to transmit stored energy to, the transmitter 46. As a result, the transmitter 46 is passively powered by the sensor 14. The unit 54 is advantageous because it provides more power to the transmitter 46 than if the sensor 14 transmits electrical energy directly to the transmitter 46. In a preferred embodiment, the unit 54 stores energy received from the sensor 14 until sufficient to power the transmitter 46, in the event that the electrical power produced by the sensor 14 is not sufficient to transmit signals. The unit 54 may also convert the energy from the sensor 14 into voltages and currents that are more appropriate for the transmitter 46 to use in generating signals.

Figure 8:
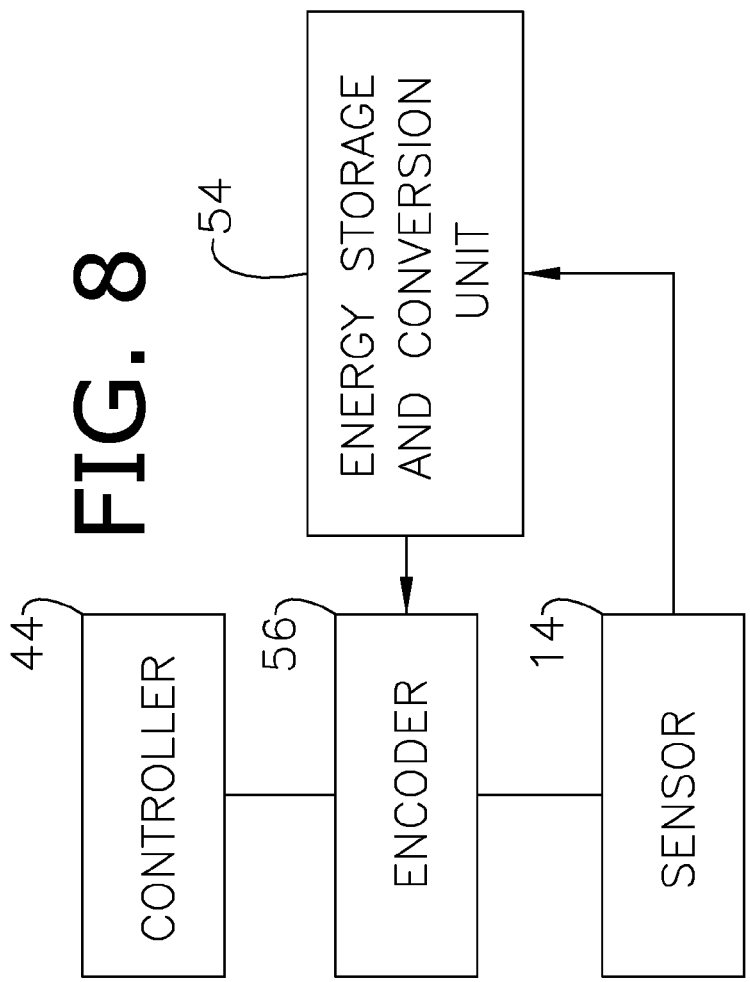
FIG. 8 is a segmental view of the schematic shown in FIG. 7 further including an encoder communicatively coupled to a respective sensor, energy conversion and storage unit, and a controller, in accordance with a preferred embodiment of the invention.
Figure 7:
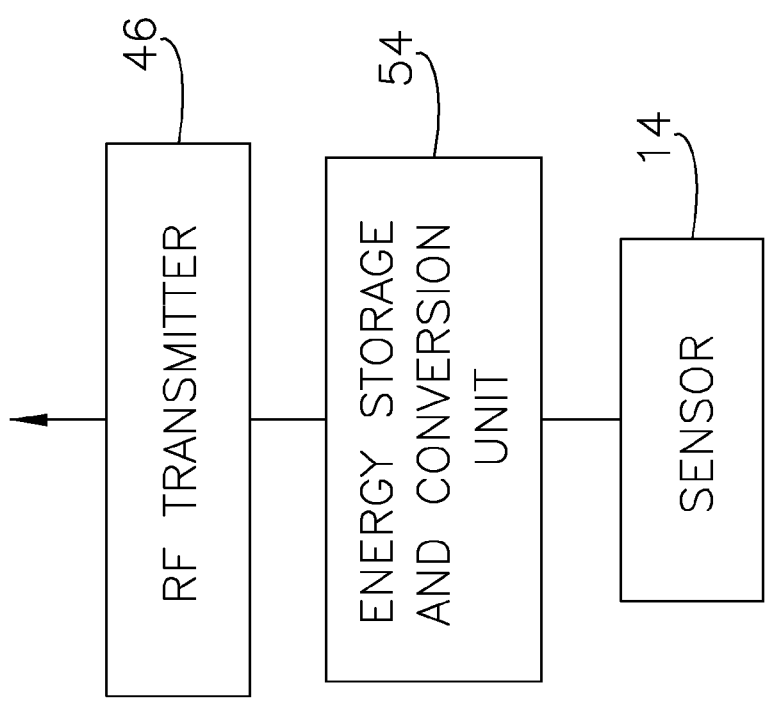
FIG. 7 is a segmental view of the schematic shown in FIG. 6 further including an energy storage and conversion unit intermediate each sensor and transmitter, in accordance with a preferred embodiment of the invention.

In the alternative embodiment shown in FIG. 8, the RF transmitters 46 and receiver 48 are replaced by an encoder 56. The encoder 56 is operatively connected to the controller 44, and configured to convert the electrical current generated by the sensor 14 to the communication protocols on the vehicle information bus 50, whereas this function was built into the transmitters 46 and receiver 48. Moreover, an energy storage and conversion unit 54, which is powered from the power source 18 or sensor 14 can be provided so as to provide long-term power storage for the condition in which the vehicle power is off.

The power source 18 is preferably presented by the charging system, including the battery, of the vehicle 20 via a series of electrical leads, fuses and/or connectors (FIG. 6). The sensors 14, RF transmitter/receiver 46,48 or encoder 56, controller 44 and power adjustment system 16 may all be powered through the vehicle bus 50 by the source 18. An auxiliary battery (not shown) may further be employed in the event that boosting of the RF signal is desirable, such as in the case where the amount or frequency of displacement of the sensor decreases with time, or in the case where the charge generation of the sensor becomes less efficient due to, e.g., high or low temperatures. Alternatively, power for the transmitters 46 may also be generated with a mechanical system, e.g., a spring that is compressed or wound by a ratchet due to motion of the vehicle 20. The energy generated by such a mechanical system could be released to charge a battery or capacitor, perhaps through motion of a magnet in a coil, when the temperature is out of specific bounds, e.g., using a shape memory material trigger. The charged battery would then power the sensor/transmitter combination.

As alternatively shown in FIG. 9, the energy storage and conversion unit 54, sensors 14, and transmitters 46 may be powered by a main wireless energy transmitter 58 that transmits energy from the power source 18. The main transmitter 58 may be, for example, an RF transmitter, such as from an internal vehicle bluetooth system, a radio frequency identification (RFID) type interrogator, etc. The transmitter 58 may also be inductively coupled to the unit 54. The energy provided by the main transmitter 58 can be used to supplement the energy generated by sensors 14 when the energy generated by the sensors 14 is insufficient to power the transmitters 46. Finally, it is appreciated that power transmitted by the main transmitter 58 or the vehicle bus 50 enables the use of sensor materials such as resistive structures, e.g., graphite-filled elastomers, and in general materials with very high extension where the resistance changes dramatically with strain, and with which a very small current provides a voltage reading.

The preferred forms of the invention described above are to be used as illustration only, and should not be utilized in a limiting sense in interpreting the scope of the present invention. Obvious modifications to the exemplary embodiments and methods of operation, as set forth herein, could be readily made by those skilled in the art without departing from the spirit of the present invention. The inventors hereby state their intent to rely on the Doctrine of Equivalents to determine and assess the reasonably fair scope of the present invention as pertains to any system or method not materially departing from but outside the literal scope of the invention as set forth in the following claims.

What is claimed is:

1. A recliner adapted for supporting an object, and to autonomously determine an obstacle to a fore or aft reclining adjustment, said recliner comprising:
    a base configured to support the object;
    a structural member configured to further support the object, and pivotally connected to the base, such that the base and member cooperatively define an angle of inclination therebetween;
    a power adjustment system configured to autonomously adjust the angle, when actuated; and
    at least one sensor secured relative to the base or member, operable to detect the presence of the object, and including an active material element operable to undergo a reversible change in at least one attribute when exposed to an activation signal or when exposure to the signal is discontinued, wherein detection of the object is caused by the change,
    said sensor being communicatively coupled to, and configured to selectively prevent actuation of the system, when the object is detected,
    wherein said at least one sensor further includes an RF transmitter, the system includes an RF receiver and controller, the transmitter is configured to send a data signal having an amplitude based on the change to the receiver, and the receiver further conveys the data signal to the controller.

2. The recliner as claimed in claim 1, wherein the element consists essentially of a material selected from the group consisting of electrorestrictives, magnetorestrictives, electroactive polymers, ionic polymer metal composites, multiferroic materials, Ferroelectret foams; resonant magnet/coil combinations, and shape memory materials.

3. The recliner as claimed in claim 1, wherein the element is in the shape of a patch presenting a lateral surface area of engagement between 3 to 20 $cm^2$.

4. The recliner as claimed in claim 1, wherein the element is in the shape of a longitudinal strip presenting a lateral dimension and a longitudinal dimension greater than five times the lateral dimension, and the strip is longitudinally pre-tensioned.

5. The recliner as claimed in claim 1, wherein a plurality of sensors is secured to the base and member, the base and member define engaging surfaces, and each sensor is configured to detect engagement between the respective engaging surface and object, as a result of deformation or displacement of the element by the object.

6. The recliner as claimed in claim 5, further comprising:
    a headrest attached to the member and defining an engaging surface.

7. The recliner as claimed in claim 5, wherein the member defines opposite first and second engaging surfaces each communicatively coupled to a separate one of the sensors, so as to be configured to detect objects fore and arrear the member when the angle is decreased and increased respectively.

8. The recliner as claimed in claim 1, wherein the base and member define engaging surfaces, and the element is in the shape of a sheet generally coextending with each surface.

9. The recliner as claimed in claim 1, wherein said at least one sensor further includes an energy storage and conversion unit intermediate and communicatively coupled to the sensor and RF transmitter.

10. The recliner as claimed in claim 9, wherein said at least one sensor further includes an amplifier communicatively coupled to the transmitter and configured to selectively increase the amplitude of the signal.

11. The recliner as claimed in claim 9, wherein said at least one sensor, unit, and transmitter are confined and operable within the member or base, so as to present a stand-alone configuration.

12. A recliner adapted for supporting an object, and to autonomously determine an obstacle to a fore or aft reclining adjustment, said recliner comprising:
   a base configured to support the object;
   a structural member configured to further support the object, and pivotally connected to the base, such that the base and member cooperatively define an angle of inclination therebetween;
   a power adjustment system configured to autonomously adjust the angle, when actuated; and
   at least one sensor secured relative to the base or member, operable to detect the presence of the object, and including an active material element operable to undergo a reversible change in at least one attribute when exposed to an activation signal or when exposure to the signal is discontinued, wherein detection of the object is caused by the change,
   said sensor being communicatively coupled to, and configured to selectively prevent actuation of the system, when the object is detected,
   wherein said at least one sensor further includes an encoder and an energy storage and conversion unit communicatively coupled to the encoder, and the system includes a controller communicatively coupled to the encoder.

13. A recliner adapted for supporting an object, and to autonomously determine an obstacle to adjustment, said recliner comprising:
   a base configured to support the object;
   a structural member configured to further support the object, and pivotally connected to the base, such that the base and member cooperatively define an angle of inclination therebetween;
   a power adjustment system configured to autonomously adjust the angle, when actuated, and including RF receiver and a controller communicatively coupled to the receiver; and
   at least one sensor secured to the base or member, operable to detect the presence of the object, and including an RF transmitter and a piezoelectric polymer element operable to generate a charge when caused to be deformed by the object, wherein detection of the object is based on measuring a deformation over a period,
   said transmitter being communicatively coupled to the RF receiver, such that the sensor is communicatively coupled to the system,
   said sensor, transmitter, receiver and controller being cooperatively configured to prevent actuation of the system, when the object is detected.

* * * * *